United States Patent [19]
Larsen

[11] 3,861,415
[45] Jan. 21, 1975

[54] FLOW ACTUATED AUTOMATIC VALVE
[75] Inventor: Olaf E. Larsen, Bartlesville, Okla.
[73] Assignee: Phillips Petroleum Company, Bartlesville, Okla.
[22] Filed: Dec. 19, 1972
[21] Appl. No.: 316,528

[52] U.S. Cl............ 137/513.5, 137/462, 137/519.5
[51] Int. Cl............................................ F16k 15/04
[58] Field of Search........ 137/460, 462, 513.5, 517, 137/519, 519.5, 533.11, 533.15

[56] References Cited
UNITED STATES PATENTS

| 834,855 | 10/1906 | Woodman et al. | 137/513.5 X |
| 1,011,797 | 12/1911 | Howell | 137/519.5 X |
| 1,144,657 | 6/1915 | Keller | 137/519.5 X |
| 2,349,155 | 5/1944 | Finley et al. | 137/543.19 |
| 3,308,847 | 3/1967 | Umann | 137/505.42 X |
| 3,683,957 | 8/1972 | Sands | 137/460 X |
| 3,727,635 | 4/1973 | Todd | 137/519.5 X |
| 3,729,022 | 4/1973 | Roach | 137/533.15 |

FOREIGN PATENTS OR APPLICATIONS

| 750,018 | 5/1933 | France | 137/513.5 |
| 5,647 | 3/1913 | Great Britain | 137/460 |

Primary Examiner—Robert G. Nilson

[57] ABSTRACT

A flow actuated automatic valve has first and second ends and a passageway formed therethrough having first, second and middle portions, a ball positioned in the middle portion of the passageway, means for preventing the ball from passing through the first end portion of the passageway, and a ball seating element positioned in the second end portion of the passageway. The ball seating element has an interrupted annular seating surface extending about an opening therethrough which is in communication with the middle and second end portions of the passageway. The seating surface is mateable with the ball for receiving the ball and reducing the flow of fluid to the valve in response to a preselected flow rate through said valve.

18 Claims, 1 Drawing Figure

PATENTED JAN 21 1975　　3,861,415
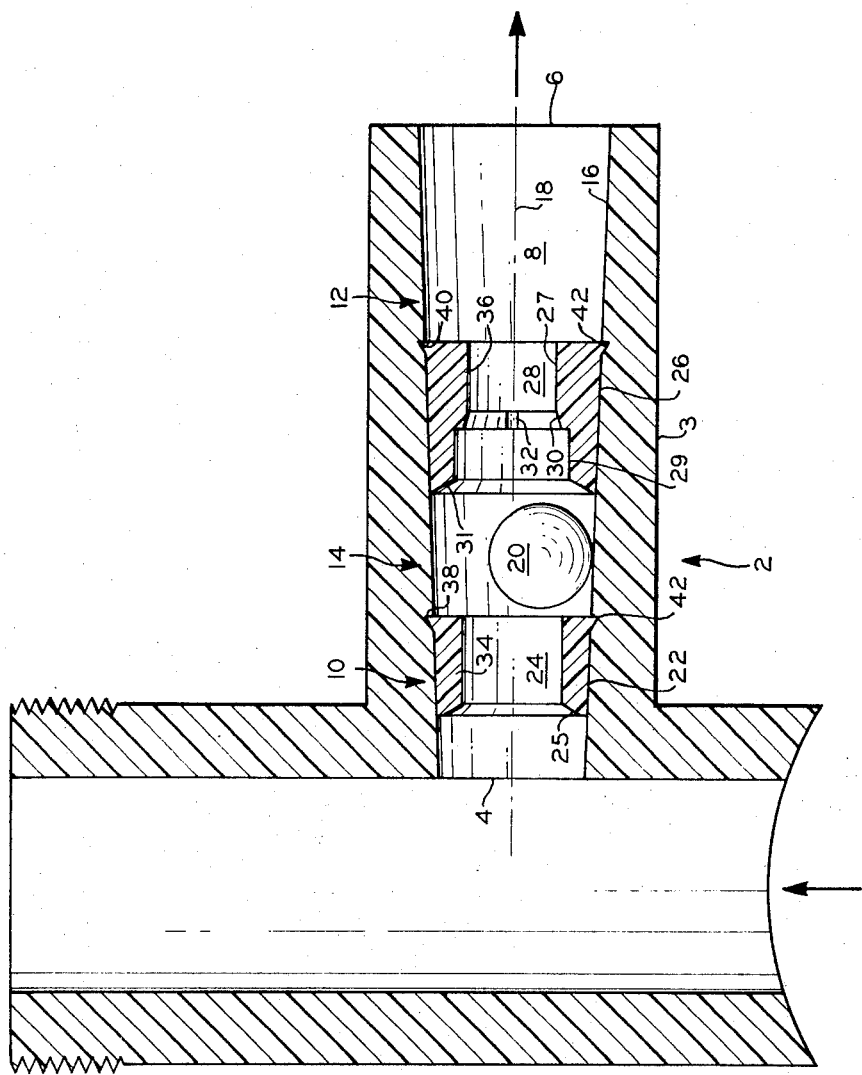

FLOW ACTUATED AUTOMATIC VALVE

It is desirable to provide a flow actuated automatic valve which is of simple construction. The valve of this invention is particularly useful as a safety valve positioned in the lateral lines from a main line. An example would be a main gas line having a plurality of lateral lines extending outwardly therefrom to supply gas to houses, for example. As long as the flow rate through the valve is maintained below a preselected maximum flow rate, the valve will remain open. In the event the flow rate through the lateral valve increases to a value greater than the preselected flow rate, for example, in response to a break in the lateral line, the ball of the valve will seat and reduce the flow of the gas through the lateral line to a very small rate. Upon repair of the broken lateral line, the lateral system will pressure up in response to the small rate of flow through the valve. Upon the lateral line reaching a preselected minimum pressure, the ball will automatically be unseated and the valve will be automatically open.

This invention, therefore, resides in a flow actuated automatic valve having first and second ends and a passageway formed therethrough having first and second and mateable portions, a ball positioned in the middle portion of the passageway means for preventing the ball from passing through the first end portion of the passageway and a ball seating element positioned in the second end portion of the passageway. The ball seating element has an interrupted annular seating surface extending about an opening therethrough which is in communication with the middle and second end portions of the passageway. The seating surface is mateable with the ball for receiving the ball and reducing the flow of fluid through the valve in response to a preselected flow rate through said valve.

Other aspects, objects, and advantages of the present invention will become apparent from a study of the disclosure, the appended claims, and the drawing.

The drawing is a diagrammatic view of the valve of this invention. In the drawing, the valve forms a part of a hot tapping tee. It should be understood, however, that the valve can be of other construction and be associated with other piping systems without departing from the invention as set forth herein.

Referring to the drawing, the valve 2 has a valve body 3 having first and second ends 4, 6 and a passageway 8 extending therethrough. The passageway 8 has first and second end portions 10, 12 and a middle portion 14.

The passageway 8 preferably is of a generally cylindrical configuration having walls 16 which taper outwardly from its axis 18 in a direction from the first end 4 toward the second end 6. This taper is for providing a sealing surface as will be later more fully described.

The valve body 3 is preferably formed of thermoplastic resin, such as for example, polyethylene, polypropylene, nylon, polyvinyl chloride, and the like.

A ball 20 is positioned in the middle portion of the valve passageway 8. The ball can be formed of various materials and be of various diameters which are selected in response to the preselected actuation pressure as will be later more fully described. It is preferred, however, that the ball be a steel ball and more preferably, a stainless steel ball in order to reduce erosion and corrosion of the ball and thereby provide a valve which will operate under severe conditions for extended periods of time.

A stop element 22 is positioned in the first end portion 10 of the passageway 8 and is fixedly connected to the valve body 3. The stop element 22 preferably is of a generally cylindrical configuration and has an opening 24 extending therethrough in communication with the first and middle portions 10, 14 of the passageway 8. The opening 24 is of dimensions relative to the dimensions of the ball 20 preventing the ball 20 from passing through the first end portion 10 of the passageway 8. It should be understood that the stop element 22 can be of other construction for preventing the ball 20 from passing through the first end portion 10 of the passageway 8. For instance, opening 24 can have flared portion 25 without departing from the invention.

A ball seating element 26 is positioned in the second end portion 12 of the passageway 8 and is fixedly connected to the valve body 3.

The ball seating element 26 is preferably of a generally cylindrical configuration and has an opening 28 extending therethrough in preferred communication with the middle and second end portions 14, 12 of the passageway. The ball seating element 26 has an interrupted annular seating surface 30 between the minor diameter portion 27 and the major diameter portion 29 of the opening 28 for example. The seating surface 30 is of a configuration relative to the ball 20 mating with an outer surface of the ball 20 along a portion of said surface 30. Ball seating element 26 can have flared portion 31 at its major diameter end 29 to facilitate entry of ball 20.

The seating surface 30 of the element 26 is interrupted by, for example, a slot 32, opening, or protrusion on a surface 30 for preventing sealing between the ball and the surface 30 over the entire surface 30. The purpose for the interruption will be later more fully described.

It is preferred that the stop element 22 and the ball seating element 26 each have a small taper through their outer walls 34, 36 with the taper extending outwardly in a direction from the first end 4 to the second end 6 in the installed position. This taper of the walls 34, 36 is mateable with the walls 16 of the passageway 8 at the preselected positions of the elements 22, 26 with the passageway 8 for enhancing connection of the elements 22, 26 to the valve body 3 and preferably forceable, sealing engagement therewith. However, it is not essential that the walls of passageway 8 be tapered or that walls 34, 36 be tapered. Both can have a straight cylindrical configuration extending to the flanges 38, 40.

It is further preferred that at least one, more preferably each of the elements 22, 26 have an annular flange 38, 40 extending outwardly therefrom about its respective walls 34, 36. The flanges 38, 40 are constructed to have a diameter slightly larger than the diameter of the passageway at the location of which its respective elements 22, 26 are fixedly connected to valve body 3. Further, it is preferred that the flange 38 and/or 40 have a sharp angular edge 42 and be constructed having a taper extending outwardly in a direction from the first end 4 toward the second end 6 of the valve 2 in the installed position of the element 22 and/or 26.

By so constructing the elements, said elements can be forced to their connected positions in their valve body. At this position, the mating outer walls 34, 36 will provide a seal with the walls 16 of the passageway 8 and help maintain the elements 22, 26 in their desired position by frictional force. The flanges 38, 40 will slide along the passageway wall 16 during installation of the elements 22, 26 owing to the taper of the flanges 38, 40 but will be maintained against movement toward the second end 6 by the sharp edges 42 thereof. The flanges 38, 40 are preferably an integral part of their respective elements 22, 26 and the elements 22, 26 are preferably one of harder, more rigid material than that forming the valve body. An example of the material which has been found desirable for forming the elements 22, 26 is nylon 6—6. This material is relatively inexpensive, light weight, easily formed, and has properties that are resistant to impact, erosion, and corrosion to which they will be subjected. Other materials including metal, however, can be utilized.

Whereas, slot 32 is utilized to interrupt the sealing surface 30, it is preferred that the slot have a width in the range of about 1/64 to 1/16 inch and a depth in the range of about 1/64 to 1/16 inch where the diameter of the sealing surface is in the range of about 5/16 to about 1 inch. At greater dimensions, the volume of material passing the valve in the closed position of the valve will be excessive, thereby resulting in waste and at less than those dimensions, the time required to reach a preselected downstream pressure for automatically opening the valve, in generally utilized conditions of the invention, will be excessive which will result in waste of time and utilization of the system on which it is installed.

The following is an example valve of this invention which has proven to be of excellent quality and operability.

EXAMPLE

Dimensions for flow activated automatic valve elements for 1-inch polyethylene hot tapping tee are shown as follows:

| | | |
|---|---|---|
| Stop element (22): | Outside diameter | .760" |
| | Maximum diameter of flange (38) | .840" |
| | Length of flange taper | 7/64" |
| | Inside diameter (24) | 7/16" |
| | Length of inside diameter | 1/4" |
| | Maximum inside diameter of flared end (25) | 5/8" |
| | Length of flared end | 1/4" |
| | Overall length | 1/2" |
| | Material | Nylon |
| Ball seating element (26): | Outside diameter | .830" |
| | Maximum diameter of flange (40) | .930" |
| | Length of flange taper | 7/64" |
| | Minor inside diameter (27) | 7/16" |
| | Length of minor inside diameter | 15/64" |
| | Major inside diameter (29) | 9/16" |
| | Length of major inside diameter | 5/32" |
| | Angle of seating surface (30) (between major and minor inside diameter) | 30° |
| | Depth of seating surface (30) | 1/64" |
| | Slot length (32) | 1/32" |
| | Slot width (32) | 1/32" |
| | Maximum inside diameter of flared end (31) | 3/4" |
| | Depth of flare | 3/32" |
| | Overall length | 1/2" |
| | Material | Nylon |
| Ball (20): | Diameter | 1/2" |
| | Material | Stainless steel |

It will be obvious to one skilled in the art that upon finalization of the desired valve passageway dimensions, based on desired fluid flow through the valve, that the opening 26 and ball dimensions can be easily determined for causing the ball to seat at or above a preselected flow rate.

In an example operation of the valve, gas flows from a main line into the passageway of the valve via the first end 4, through the openings 24, 28 and is discharged from the second end 6 into a lateral line which passes to burners in a house, for example.

With all the burners within the house wide open, flow through the valve will be at a first rate. If a break occurs which increases the flow above the first rate to a second preselected rate or above said preselected rate, the ball will seat, thereby substantially terminating flow of gas through the lateral to the house, thereby reducing the danger of explosion.

After repair of the break, the second small amount of gas leaking through the slot 32 will cause the differential pressure across the ball in element 26 to be reduced to a value at which the ball will unseat and full service to the lateral will automatically be replaced.

Other modifications and alterations of this invention will become apparent to those skilled in the art from the foregoing discussion, example, and accompanying drawing, and it should be understood that this invention is not to be unduly limited thereo.

That which is claimed is:

1. A flow actuated automatic valve, comprising:
a valve body having first and second ends and a passageway having first, second, and middle portions extending therethrough; and
means for permitting fluid flow below a preselected maximum flow rate through said valve body and substantially terminating the flow through said valve body in response to a flow rate equal to or in excess of said preselected maximum flow rate, comprising:
a ball positioned in said middle portion of said valve passageway,
means for preventing the ball from passing through said first end portion of said passageway, and a ball seating element fixedly connected to said valve body and positioned in said second end portion of said passageway, said seating element having an opening extending therethrough in communication with said middle and second end portions of said passageway and an interrupted annular seating surface extending about said opening and being mateable with an outer surface of said ball for receiving said ball and thereby substantially terminating the flow of fluid through said valve in response to a flow rate equal to or in excess of said preselected maximum flow rate, said ball seating element having an annular flange extending outwardly therefrom, said flange having a diameter larger than the diameter of said passageway at the location at which said ball seating element is fixedly connected to said valve body for forceably engaging said valve body.

2. A valve, as set forth in claim 1, wherein the means for preventing the ball from passing through the first end portion of said passageway is a stop element fixedly connected to the valve body and having an opening extending therethrough in communication with the first and middle portions of the valve passageway.

3. A valve, as set forth in claim 1, wherein the ball seating element has tapered outer walls mateable with the walls of the valve passageway at a preselected location in the second portion of the passageway.

4. A valve, as set forth in claim 3 wherein said valve body is formed of a thermoplastic resin and said ball seating element is formed from a material of greater hardness than said thermoplastic resin.

5. A valve, as set forth in claim 4, wherein the flange has a sharp annular edge and is tapered outwardly in a direction from the first toward the second end of the valve in the installed position thereof.

6. A valve, as set forth in claim 5, wherein the valve passageway is a generally cylindrical passageway having walls tapering outwardly in a direction from the first end toward the second end.

7. A valve, as set forth in claim 6, wherein the ball is a steel ball, wherein the thermoplastic material from which said valve body is constructed comprises polyethylene, and wherein the material from which said ball seating element is formed comprises nylon.

8. A valve, as set forth in claim 1, wherein the annular seating surface is interrupted by slot formed therethrough, said slot being in fluid communication with the middle and second portions of the passageway in the seated position of the ball.

9. A valve, as set forth in claim 8, wherein the slot is in the range of about 1/64 to 1/16-inch wide to 1/64 to 1/64-inch deep where the diameter of the opening at the seating surface is in the range of about 5/16-inch to about 1 inch.

10. A valve, as set forth in claim 1, wherein said valve body is formed of a thermoplastic resin and said ball seating element is formed from a material of greater hardness than said thermoplastic resin.

11. A flow actuated valve, comprising:
a valve body having first and second ends and a passageway having first, second and middle portions extending therethrough;
a ball positioned in said middle portion of said valve passageway;
means for preventing said ball from passing through said first end portion of said passageway; and a ball seating element positioned in said second end portion of said passageway, said seating element having an interrupted annular seating surface mateable with an outer surface of said ball for receiving said ball, said ball seating element having an annular flange extending outwardly therefrom, said flange having a sharp angular edge and having a diameter larger than the diameter of said passageway adjacent said ball seating element.

12. A valve in accordance with claim 11 wherein said annular flange is tapered outwardly from said ball seating element in a direction from said first portion to said second portion of said passageway.

13. A valve in accordance with claim 11 wherein said seating element is formed from the material of greater hardness than the material of said valve body.

14. A valve in accordance with claim 13 wherein said valve body is formed of a thermoplastic resin.

15. A valve in accordance with claim 11 wherein the outer walls of said ball seating element are mateable with the walls of said passageway at a preselected location in said second portion of said passageway.

16. A valve in accordance with claim 15 wherein said ball seating element has tapered outer walls.

17. A valve in accordance with claim 11 wherein said annular seating surface is interrupted by a slot formed therethrough, said slot being in full communication with the middle and second portion of said passageway when said ball is in a seated relationship with said seating element.

18. A valve in accordance with claim 11 wherein said means for preventing said ball from passing through said first end portion of said passageway comprises a stop element having an annular flange extending outwardly therefrom, said flange having a diameter larger than the diameter of the passageway adjacent said stop element, said flange having a sharp annular edge and being tapered outwardly in a direction from said first end portion to said second end portion of said passageway.

* * * * *

UNITED STATES PATENT AND TRADEMARK OFFICE
CERTIFICATE OF CORRECTION

PATENT NO. : 3,861,415
DATED : January 21, 1975
INVENTOR(S) : Olaf E. Larsen

It is certified that error appears in the above–identified patent and that said Letters Patent are hereby corrected as shown below:

Column 5, line 53, before "deep" delete "1/64-inch" and insert -- 1/16-inch --.

Signed and Sealed this

Seventeenth Day of August 1976

[SEAL]

Attest:

RUTH C. MASON
*Attesting Officer*

C. MARSHALL DANN
*Commissioner of Patents and Trademarks*